UNITED STATES PATENT OFFICE.

HENRY C. PETTY, OF VALLEJO, CALIFORNIA.

MIXED PAINT.

SPECIFICATION forming part of Letters Patent No. 301,149, dated July 1, 1884.

Application filed September 12, 1883. (Specimens.)

*To all whom it may concern:*

Be it known that I, HENRY C. PETTY, a citizen of the United States, residing at Vallejo, in the county of Solano and State of California, have invented a new and useful Paint Compound, of which the following is a specification.

This invention relates to paint compounds, and is especially adapted for use upon ship or boat bottoms, wharves, piles, and other surfaces subject to the action of salt or fresh water. Its object is to provide a simple and inexpensive compound possessing superior advantages in point of durability and general efficiency.

My compound consists of the following ingredients, compounded in about the proportions stated, to wit: coal-tar, twenty gallons; asphaltum varnish, two and one-half gallons; brown Japan drier, two and one-half gallons; carbolic acid, one pint; lime-water, one-half gallon; soda-water, (solution sal-soda,) one-half gallon; Venetian red, fifty pounds; india-rubber, five pounds; arsenic, eight pounds; strong solution salt-water, one gallon; brimstone, eight pounds; corrosive sublimate, five pounds; solution of alum, one gallon; benzine, three gallons; turpentine, one and one-half gallon.

In compounding my improved paint the strength of the solution of sal-soda is one part soda to four water; strength of solution of salt, one part salt to three water; strength of solution of alum, one part alum to two water. These ingredients are to be thoroughly mixed by agitation or other suitable means, and then applied in the usual manner.

The advantages of my improved compound will be readily understood and appreciated. It serves to preserve the timber and render it impervious to water or dampness, and prevents salt-water worms and barnacles from working in. When used on metal surfaces, the paint will expand and contract with the metal and will therefore not crack or scale off, nor will it blister and corrode on metal.

I claim—

The herein-described paint compound, consisting of coal-tar, asphaltum varnish, Japan drier, carbolic acid, lime-water, solution sal-soda, Venetian red, india-rubber, arsenic, solution salt-water, brimstone, corrosive sublimate, solution of alum, benzine, and turpentine, in about the proportions specified.

In testimony that I claim the foregoing as my own I have hereto affixed my signature in presence of two witnesses.

HENRY C. PETTY.

Witnesses:
ROSWELL SCOTT,
CHAS. F. CHILBERS.